(12) United States Patent
Tamai et al.

(10) Patent No.: US 12,367,533 B2
(45) Date of Patent: Jul. 22, 2025

(54) BATTERY MANAGEMENT SYSTEM AND BATTERY MANAGEMENT METHOD

(71) Applicant: HONDA MOTOR CO., LTD., Tokyo (JP)

(72) Inventors: Tomoko Tamai, Tokyo (JP); Takashi Komaru, Tokyo (JP); Masanori Okabe, Tokyo (JP); Eiji Teramoto, Tokyo (JP); Kohei Fukunishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 18/480,445

(22) Filed: Oct. 3, 2023

(65) Prior Publication Data

US 2024/0119544 A1 Apr. 11, 2024

(30) Foreign Application Priority Data

Oct. 7, 2022 (JP) .................. 2022-162536

(51) Int. Cl.
*G06Q 50/06* (2024.01)
*G06Q 30/0283* (2023.01)
*H02J 7/00* (2006.01)

(52) U.S. Cl.
CPC ......... *G06Q 50/06* (2013.01); *G06Q 30/0283* (2013.01); *H02J 7/00032* (2020.01); *H02J 7/0047* (2013.01)

(58) Field of Classification Search
CPC . G06Q 50/06; G06Q 30/0283; H02J 7/00032; H02J 7/0047
See application file for complete search history.

(56) References Cited

U.S. PATENT DOCUMENTS

| | | | |
|---|---|---|---|
| 2016/0226250 A1* | 8/2016 | Fukubayashi | H02J 3/008 |
| 2023/0024279 A1* | 1/2023 | Tanno | H01M 10/425 |
| 2023/0119821 A1* | 4/2023 | Sharma | H01M 10/441 |
| | | | 320/124 |

FOREIGN PATENT DOCUMENTS

| | | |
|---|---|---|
| EP | 4120429 A1 | 1/2023 |
| JP | 6869580 B1 | 5/2021 |
| JP | 6912125 B1 | 7/2021 |

* cited by examiner

*Primary Examiner* — Carlos Amaya
(74) *Attorney, Agent, or Firm* — Rankin, Hill & Clark LLP

(57) ABSTRACT

A higher usage fee is set for external supply power as predetermined contract power increases. A battery management system includes: a contract power information acquisition section configured to acquire contract power information indicating the contract power; a power-in-use estimation section configured to estimate power in use in the storage plant in a target time zone in future; a discharge plan creation section configured to create a discharge plan in which discharge power from the battery is supplied as power to be used in the storage plant when the power in use in the target time zone exceeds the contract power; and a discharging control section configured to discharge the battery on the basis of the discharge plan. The power in use in the target time zone is estimated by the power-in-use estimation section.

5 Claims, 5 Drawing Sheets

BATTERY MANAGEMENT SYSTEM AND BATTERY MANAGEMENT METHOD

INCORPORATION BY REFERENCE

The present application claims priority under 35 U.S.C. § 119 to Japanese Patent Application No. 2022-162536 filed on Oct. 7, 2022. The content of the application is incorporated herein by reference in its entirety.

BACKGROUND OF THE INVENTION

Field of the Invention

The present invention relates to a battery management system and a battery management method.

Description of the Related Art

In recent years, the reuse of secondary cells has been researched and developed to secure more people access to reasonable, reliable, sustainable, and advanced energy. The reuse of secondary cells contributes to an increase in the efficiency of energy. For example, Japanese Patent Nos. 6869580 and 6912125 each disclose a configuration in which, when used batteries are stored, used batteries to be discharged or charged are selected on the basis of the current values and the voltage values and the predetermined SOC (State Of Charge) ranges of the respective used batteries and the used batteries to be charged are supplied with charging power from the used batteries to be discharged to cause the SOCs of the respective used batteries to fall within predetermined ranges.

Incidentally, the possible application of discharge power from a stored used battery includes use as a power supply for equipment used in a plant in which the used battery is stored in addition to use for charging another used battery as with the related art described above. The use of the discharge power from the used battery as the power supply for the equipment in this way makes it possible to decrease the consumption amount of external supply power such as commercial power that is used by the equipment and reduce the cost of the external supply power in the plant. The present disclosure thus has an issue about an increase in a cost reduction effect on external supply power brought about by such use of discharge power from a used battery.

To solve the issue described above, an object of the present application is to provide a battery management system that makes it possible to increase a cost reduction effect on external supply power brought about by the use of discharge power from a collected used battery. This eventually contributes to an improvement in the efficiency of energy.

SUMMARY OF THE INVENTION

A first aspect for achieving the object described above includes a battery management system that manages charging and discharging of a used battery stored in a storage plant to which external supply power is supplied. A higher usage fee is set for the external supply power as predetermined contract power increases and the contract power is increased when the external supply power that is supplied to the storage plant exceeds the contract power. The battery management system includes: a contract power information acquisition section configured to acquire contract power information indicating the contract power; a power-in-use estimation section configured to estimate the external supply power to be used in the storage plant in a target time zone in future; a discharge plan creation section configured to create a discharge plan in which discharge power from the battery is supplied as power to be used in the storage plant when the external supply power to be used in the target time zone exceeds the contract power; and a discharging control section configured to discharge the battery on the basis of the discharge plan. The external supply power to be used in the target time zone is estimated by the power-in-use estimation section.

The battery management system described above may include an external supply power recognition section configured to recognize the external supply power that is being used in the storage plant. The discharging control section may be configured to discharge the battery to supply the discharge power from the battery as the power to be used in the storage plant when the external supply power recognized by the external supply power recognition section exceeds determination power. The determination power is set to be less than the contract power.

In the battery management system described above, a usage fee for the external supply power may be set for each of a plurality of divided time zones. The plurality of divided time zones divides a predetermined target period. The battery management system may include: an electricity rate information acquisition section configured to acquire electricity rate information indicating the usage fee for the external supply power set for each of the divided time zones; and a charging control section configured to charge, on the basis of the electricity rate information, the battery with the external supply power in the divided time zone for which a lower usage fee is set for the external supply power than a usage fee set for another divided time zone of a plurality of the divided time zones.

The battery management system described above may include a battery shipment prohibition section configured to prohibit shipment of the battery from the storage plant while the discharging control section is discharging the battery to supply the discharge power from the battery as the power to be used in the storage plant.

In the battery management system described above, the battery shipment prohibition section may prohibit the shipment of the battery from the storage plant in units of blocks. The battery includes a predetermined number of battery modules as one of the blocks in the storage plant. The battery is managed in the storage plant.

A second aspect for achieving the object described above includes a battery management method that is executed by a computer to manage charging and discharging of a used battery stored in a storage plant to which external supply power is supplied. A higher usage fee is set for the external supply power as predetermined contract power increases and the contract power is increased when the external supply power that is supplied to the storage plant exceeds the contract power. The battery management method includes: a contract power information acquisition step of acquiring contract power information indicating the contract power; a power-in-use estimation step of estimating power in use in the storage plant in a target time zone in future; a discharge plan creation step of creating a discharge plan in which discharge power from the battery is supplied as power to be used in the storage plant when the power in use in the target time zone exceeds the contract power; and a discharging control step of discharging the battery on a basis of the discharge plan. The power in use in the target time zone is estimated in the power-in-use estimation step.

The battery management system described above makes it possible to increase the cost reduction effect on the external supply power brought about by the use of the discharge power from a collected used battery.

DETAILED DESCRIPTION OF THE PREFERRED EMBODIMENTS

1. Battery Reuse Mode

Figure 1:
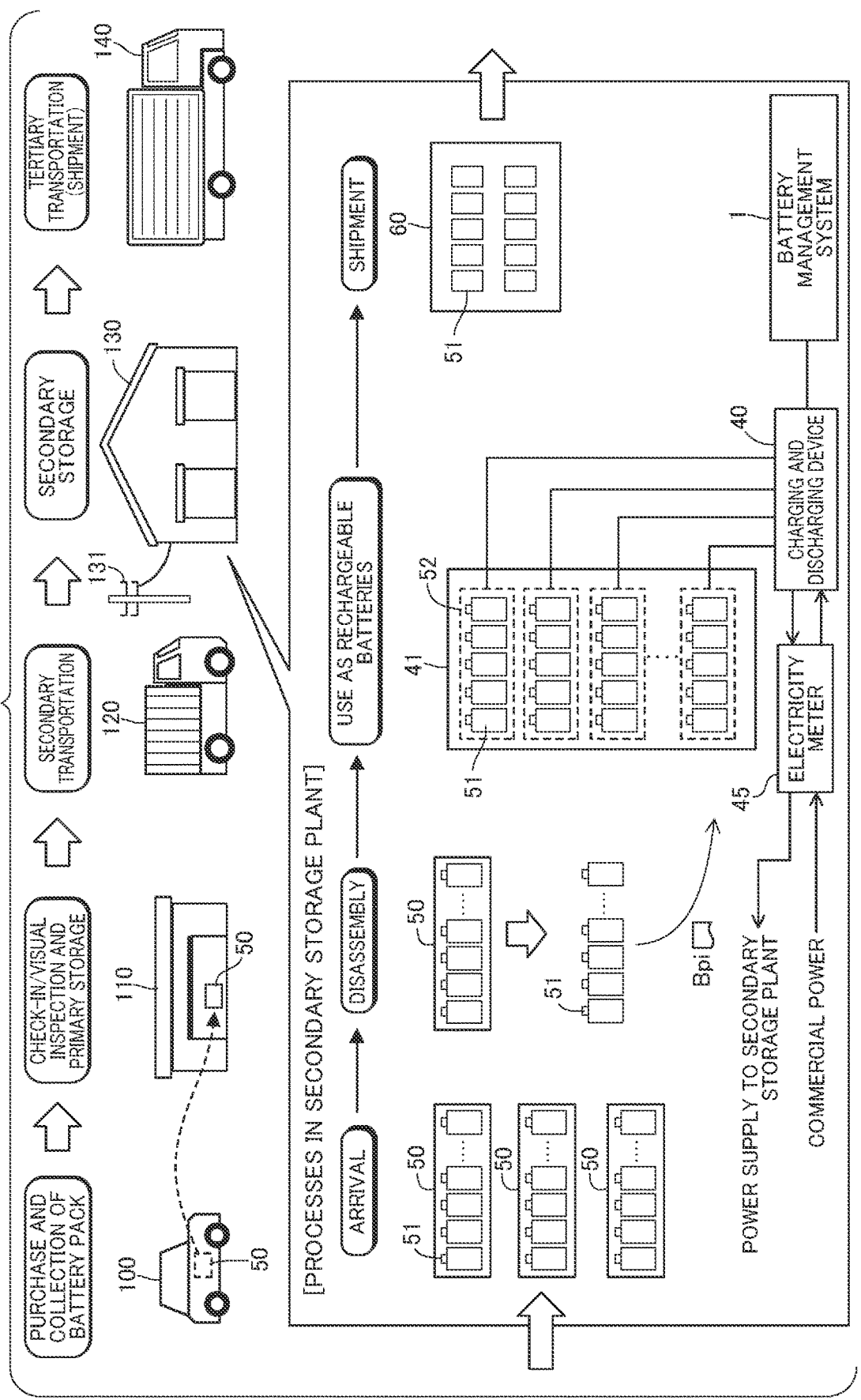
FIG. 1 is an explanatory diagram of a battery reuse mode in which a battery management system is used.

A battery reuse mode to which a battery management system 1 according to the present disclosure is applied will be described with reference to FIG. 1. In the present embodiment, an example is described in which a battery pack 50 mounted in an electric vehicle 100 is collected and battery modules 51 taken out from the disassembled battery pack 50 are stored and then shipped.

The electric vehicle 100 is a vehicle such as a BEV (Battery Electric Vehicle), an HEV (Hybrid Electric Vehicle), or a PHEV (Plug-in Hybrid Electric Vehicle) including a battery as a power source. The battery pack 50 includes the plurality of battery modules 51 connected in series or in parallel. The battery modules 51 each include a plurality of connected cells and serve as the smallest element when the battery is reused. Each of the cells is a single encapsulated unit including one positive electrode, one negative electrode, and an electrolyte solution.

The battery pack 50 collected from the electric vehicle 100 is transported (primary transportation) to a primary storage plant 110, checks in and undergoes a visual inspection, and then stored in the primary storage plant 110. The battery packs 50 stored in the primary storage plant 110 are sequentially transported (secondary transportation) to a secondary storage plant 130 by a transport vehicle 120.

The secondary storage plant 130 is supplied with commercial power (corresponding to external supply power according to the present disclosure) from commercial power supply equipment 131 and the commercial power is consumed by electric equipment and the like that are used in the secondary storage plant 130. It is to be noted that the external supply power according to the present disclosure may be power supplied from in-house power generation equipment or the like installed in a private factory in addition to the commercial power. In the secondary storage plant 130, the battery packs 50 that arrive through transportation by the transport vehicle 120 are disassembled by an operator or a robot and the battery modules 51 are taken out. In addition, battery pack information Bpi stored in a memory of each of the battery packs 50 is transferred to the battery management system 1. The battery pack information Bpi is transferred by connecting the battery pack 50 and the battery management system 1 and performing communication. Alternatively, the battery pack information Bpi is transferred by an operator operating a terminal device connected to the battery management system 1, for example, to input the battery pack information Bpi read out from the battery pack 50.

In addition, when the battery pack information Bpi is not recorded in the memory of the battery pack 50, a battery data server that communicates with the electric vehicle 100 and the battery management system 1 transfers, to the battery management system 1, the battery pack information Bpi of the battery pack 50 collected from the electric vehicle 100. The battery data server stores the battery pack information Bpi transmitted from the electric vehicle 100 in association with pieces of identification information of the electric vehicle 100 and the battery pack 50. The identification information of the battery pack 50 is referenced to transfer the battery pack information Bpi from the battery data server to the battery management system 1.

The battery pack information Bpi includes pieces of information related to the manufacture date of the electric vehicle 100 equipped with the battery pack 50 and the total distance traveled by the electric vehicle 100 equipped with the battery pack 50. It is possible to recognize the use period of the battery pack 50 from the manufacture date of the electric vehicle 100 and recognize the use condition of the battery pack 50 from the total distance traveled by the electric vehicle 100. It is to be noted that any one of the manufacture date of the electric vehicle 100 and the total distance traveled by the electric vehicle 100 alone may be included in the battery pack information Bpi or information (such as a use environment in which the electric vehicle 100 used to be) other than the manufacture date and the total traveled distance may be included in the battery pack information Bpi.

In the secondary storage plant 130, the plurality of battery modules 51 is accommodated in a battery module accommodation section 41 in units of blocks 52 and managed by the battery management system 1 in units of blocks 52. In the present embodiment, an example is described in which the five battery modules 51 are managed as the one block 52, but the number of battery modules 51 included in the block 52 may be less than 5 or greater than 5. The battery management system 1 stores the battery modules 51 accommodated in the battery module accommodation section 41 while charging and discharging the battery modules 51 by a charging and discharging device 40 in units of blocks 52.

In addition, the battery management system 1 makes defect determinations for the battery modules 51 accommodated in the battery module accommodation section 41. The battery management system 1 selects, as a shipping target, the battery module 51 determined as a non-defective product. The battery management system 1 selects, as a discarding target, the battery module 51 determined as a defective product. The battery management system 1 makes arrangements to ship the battery module 51 selected as a shipping target.

When a shipping operation is performed by a robot, the battery management system 1 makes arrangements for shipment by transmitting, to the robot, shipment instruction information including the identification information of the battery module 51 that is a shipping target. In addition, when a shipping operation is performed by an operator, the battery management system 1 makes arrangements for shipment by transmitting, to a terminal device (such as a personal computer or a tablet terminal) used by the operator, the shipment instruction information including the identification information of the battery module 51 that is a shipping target. A package 60 in which the battery modules 51 are packed is shipped from the secondary storage plant 130 through the shipping operation and delivered to a delivery destination by a transport vehicle 140.

The commercial power supplied from the commercial power supply equipment 131 is supplied to the electric equipment and the like in the secondary storage plant 130 and supplied to the charging and discharging device 40 through an electricity meter 45. The charging and discharging device 40 has a function of a power conditioner and converts the power discharged from the battery modules 51 to alternating current power compliant with the same specifications as those of the commercial power to supply the alternating current power to the electric equipment and the like in the secondary storage plant 130 through the electricity meter 45.

Although described in detail below, the battery management system 1 uses the commercial power to charge the battery modules 51 accommodated in the battery module accommodation section 41 by the charging and discharging device 40 in a time zone for which a relatively low commercial power rate is set. The battery management system 1 then supplies the discharge power from the battery module 51 as power to be used in the secondary storage plant 130 in a situation in which the commercial power rate increases, thereby executing processing of decreasing the amount of commercial power to be used and reducing the usage fees for the commercial power.

2. Configuration of Battery Management System

A configuration of the battery management system 1 will be described with reference to FIGS. 2 to 4. The battery management system 1 is a computer system including a communication unit 2, a processor 10, a memory 20, and the like. The communication unit 2 communicates with external servers such as a power company server 210 and a weather information server 220 through a communication network 200. In addition, the communication unit 2 communicates with a robot used in the secondary storage plant 130 or a terminal device (such as a personal computer or a tablet terminal) used by an operator in the secondary storage plant 130.

The battery management system 1 is connected to the charging and discharging device 40 and controls the charging and discharging of the battery modules 51 accommodated in the battery module accommodation section 41 by the charging and discharging device 40. The battery module accommodation section 41 separately accommodates the plurality of battery modules 51 in a predetermined number (the present embodiment exemplifies 5) of blocks 52. Each of the blocks 52 is provided with a battery sensor 42 that individually detects the states (such as the voltage, the current, and the temperature) of the accommodated battery modules 51.

The charging and discharging device 40 is connected to the battery module accommodation section 41. The charging and discharging device 40 supplies each of the battery modules 51 accommodated in the battery module accommodation section 41 with power to charge the battery module 51. In addition, the charging and discharging device 40 collects power output from each of the battery modules 51 to discharge the battery module 51. The charging and discharging device 40 receives a signal of detection by each of the battery sensors 42.

The battery management system 1 outputs a control signal to the charging and discharging device 40 to charge and discharge the battery modules 51 accommodated in the battery module accommodation section 41 in units of blocks 52. In addition, the battery management system 1 receives information related to detection by the battery sensor 42. The information is transmitted from the charging and discharging device 40. The battery management system 1 receives pieces of information related to the detection of the commercial power supplied from the commercial power supply equipment 131 (see FIG. 1) and power (the total value of the commercial power and the discharge power from the battery modules 51) supplied to the secondary storage plant 130. The commercial power supplied from the commercial power supply equipment 131 and the power supplied to the secondary storage plant 130 are detected by the electricity meter 45. It is to be noted that, when the power discharged from the battery modules 51 is supplied to sold to the commercial power supply equipment 131, the electricity meter 45 detects the power supplied to the commercial power supply equipment 131 and inputs information related to the detection of the sold power to the battery management system 1.

The memory 20 stores a program 21 for the battery management system 1, power consumption result data 22, and the like. In the power consumption result data 22, information is recorded that is related to a result of the consumption of the commercial power in the secondary storage plant 130 in the past. The processor 10 reads and executes the program 21 to function as a contract power information acquisition section 11, an electricity rate information acquisition section 12, an external supply power recognition section 13, a power-in-use estimation section 14, a discharge plan creation section 15, a charging and discharging control section 16, and a battery shipment prohibition section 17. The charging and discharging control section 16 has functions of a charging control section and a discharging control section according to the present disclosure.

The contract power information acquisition section 11 accesses the power company server 210 via the communication network 200 through the communication unit 2 to receive and acquire contract power information Cpi indicating contract power set for the secondary storage plant 130. Here, a contract power setting condition by a power company will be described with reference to FIG. 3.

Figure 3:
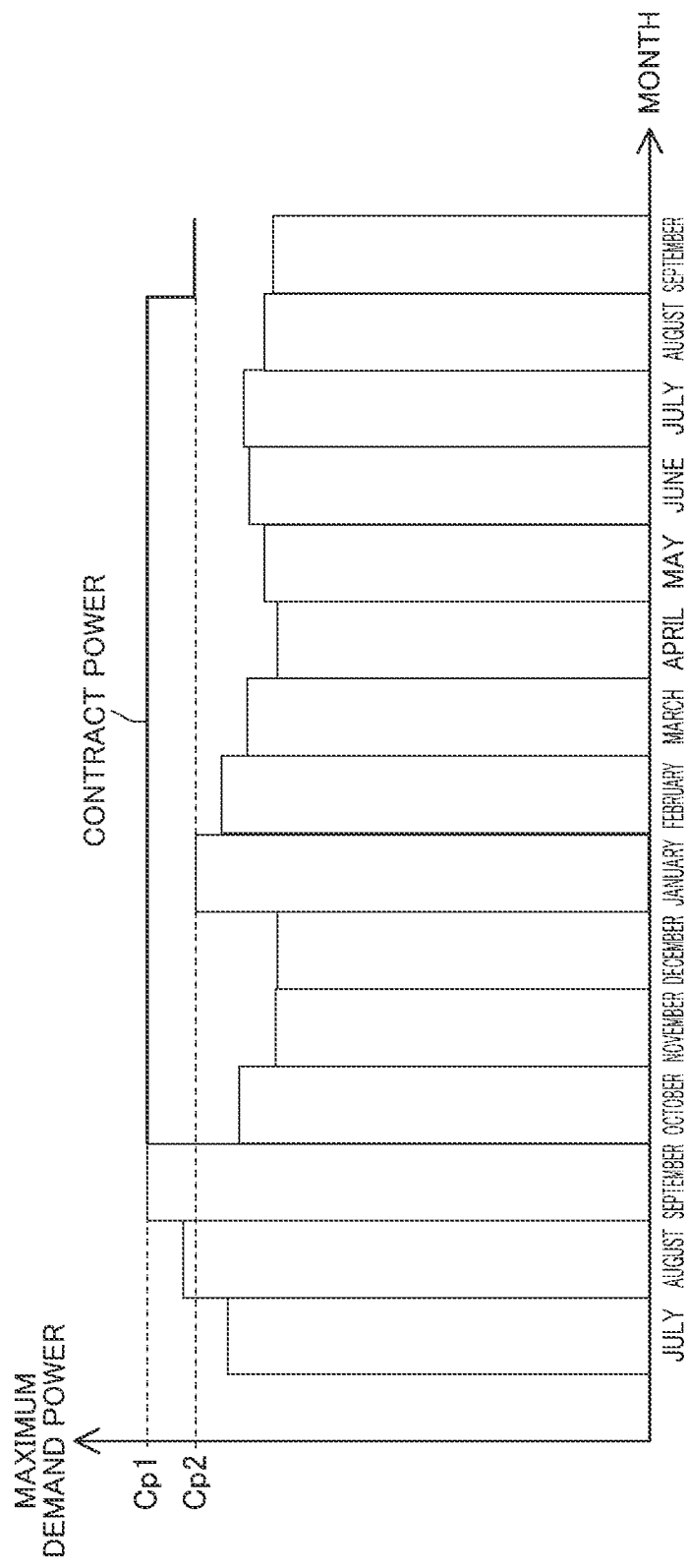
FIG. 3 is an explanatory diagram of contract power of commercial power.

FIG. 3 illustrates the transition of the maximum demand power in units of months in the past with the maximum demand powers set on the longitudinal axis and months set on the transverse axis. The maximum demand powers are the largest values in the respective months among average powers in use in the respective measurement unit periods (e.g., 30 minutes) in the months. The contract power is set at the largest value among the maximum demand powers in the respective months of the past one year including the current month.

In the example of FIG. 3, the contract power in September, which is the current month, is set at maximum demand power Cp2 in January. The maximum demand power Cp2 in January is the maximum demand power among the respective months from October of the previous year to the current month, which correspond to the past one year. In addition, maximum demand power Cp1 in September of the previous year is set as contract power from September of the previous year to August, which is the last month. As the contract power increases, higher usage fees are set for the commercial power.

The electricity rate information acquisition section 12 accesses the power company server 210 via the communication network 200 through the communication unit 2 to receive and acquire electricity rate information Eri indicating the usage fees for the commercial power for each of the time zones. The usage fees for the commercial power for each of the time zones are set for the secondary storage plant 130. Here, the setting of the usage fees for the commercial power in each of time zones will be described with reference to FIG. 4.

Figure 4:
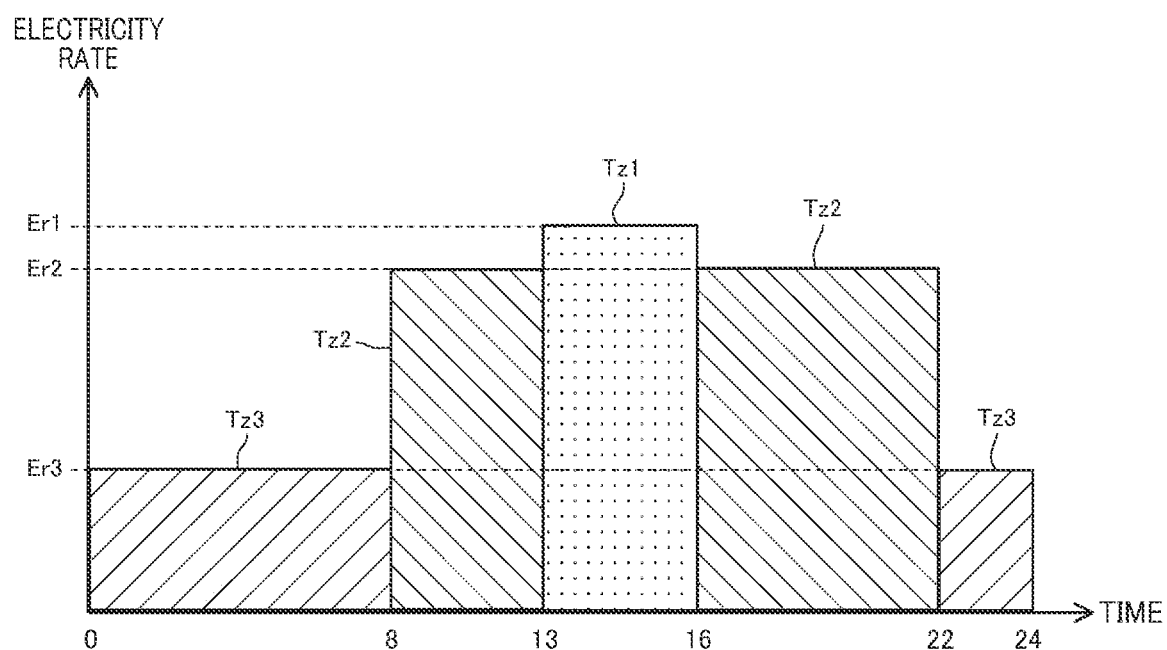
FIG. 4 is an explanatory diagram of commercial power rate setting depending on a time zone.

FIG. 4 illustrates sections of time zones of one day (from 0 o'clock to 24 o'clock corresponding to a target period according to the present disclosure) with electricity rates set on the longitudinal axis and time set on the transverse axis. FIG. 4 exemplifies a case where one day (0 o'clock to 24 o'clock) is sectioned into the three time zones (corresponding to divided time zones according to the present disclosure) of a first time zone Tz1 (13 o'clock to 16 o'clock), a second time zone Tz2 (8 o'clock to 13 o'clock and 16 o'clock to 22 o'clock), and a third time zone Tz3 (0 o'clock to 8 o'clock and 22 o'clock to 24 o'clock).

FIG. 4 is the setting of time zones for a summer season (July to September) and an electricity rate Er1 for the first time zone Tz1 that expects a high activity rate of an air conditioner is set to be the highest and an electricity rate Er2 for the second time zone Tz2 that is lower than the first time zone Tz1 in temperature is set to be lower than the electricity rate Er1 for the first time zone Tz1. In addition, an electricity rate Er3 for the third time zone Tz3 from night to early morning in which a smaller amount of power is used is set to be lower than the electricity rate Er2 for the second time zone Tz2.

The external supply power recognition section 13 recognizes the commercial power that is being used on the basis of information related to the detection of the commercial power. The information is output from the electricity meter 45. The power-in-use estimation section 14 estimates, for example, on the basis of the following first estimation condition to fifth estimation condition, the commercial power to be used in the secondary storage plant 130 in a target time zone of the battery modules 51 accommodated in the battery module accommodation section 41 in the future (e.g., such as a one-hour time zone in the next day or later).

First estimation condition: a result of the use of the commercial power in the secondary storage plant 130 in the past. The result is recorded in the power consumption result data 22.

Second estimation condition: the activation timing and the power consumption of an air conditioner in the secondary storage plant 130. The activation timing and the power consumption are predicted from expected future temperature in the area in which the secondary storage plant 130 is positioned. The expected future temperature is based on weather information Wei acquired from the weather information server 220.

Third estimation condition: the activation timing and the power consumption of illumination in the secondary storage plant 130. The activation timing and the power consumption are predicted from the sunrise time and the sunset time in the area in which the secondary storage plant 130 is positioned. The sunrise time and the sunset time are based on the weather information Wei acquired from the weather information server 220.

Fourth estimation condition: the total number of battery modules 51 accommodated in the battery module accommodation section 41 and predicted power necessary to charge the battery modules 51.

Fifth estimation condition: the total number of battery modules 51 accommodated in the battery module accommodation section 41 and predicted power used for cooling to charge and discharge the battery modules 51.

The discharge plan creation section 15 creates, on the basis of a use condition of the commercial power in the secondary storage plant 130 in the future, a discharge plan in which the battery modules 51 accommodated in the battery module accommodation section 41 are discharged and the discharge power from the battery modules 51 is supplied as power to be used in the secondary storage plant 130 in a target time zone in which the commercial power to be used is estimated to exceed the contract power. The use condition is estimated by the power-in-use estimation section 14.

When the following first discharging condition or second discharging condition is satisfied, the charging and discharging control section 16 discharges the battery modules 51 accommodated in the battery module accommodation section 41 and supplies the discharge power of the battery modules 51 to the electric equipment and the like in the secondary storage plant 130 through the charging and discharging device 40 and the electricity meter 45.

First discharging condition: the current time comes to a discharge timing set by the discharge plan.

Second discharging condition: the commercial power recognized by the external supply power recognition section 13 exceeds determination power set on the basis of the contract power. The determination power is set at a smaller value than that of the contract power.

In addition, when the following charging condition is satisfied, the charging and discharging control section 16 charges the battery modules 51 accommodated in the battery module accommodation section 41 with the commercial power by the charging and discharging device 40.

Charging condition: the battery modules 51 that are chargeable are accommodated in the battery module accommodation section 41 in the third time zone Tz3 for which a relatively low electricity rate is set as described above with reference to FIG. 4.

The battery shipment prohibition section 17 prohibits the shipment of the battery modules 51 being discharged under the control of the charging and discharging control section 16 and prevents the discharging from the battery modules 51 from being canceled.

3. Charging and Discharging Processing

A procedure of executing charging and discharging processing on the battery modules 51 accommodated in the battery module accommodation section 41 will be described in accordance with the flowchart illustrated in FIG. 5. The charging and discharging processing is executed by the battery management system 1.

Figure 5:
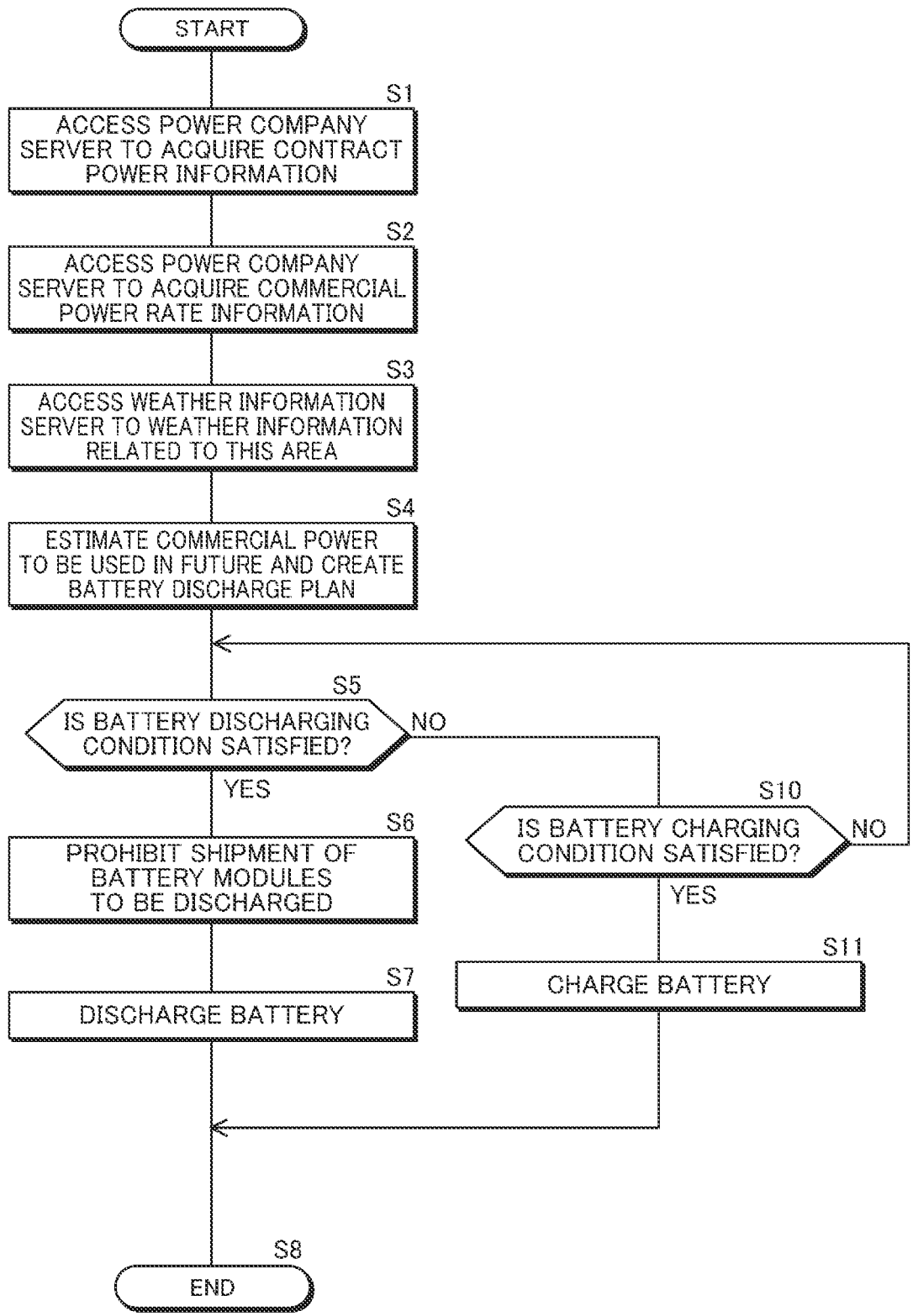
FIG. 5 is a flowchart of charging and discharging processing.

In step S1 of FIG. 5, the contract power information acquisition section 11 accesses the power company server 210 to acquire the contract power information Cpi related to the secondary storage plant 130 and store the contract power information Cpi in the memory 20. In subsequent step S2, the electricity rate information acquisition section 12 accesses the power company server 210 to acquire the electricity rate information Eri related to the secondary storage plant 130 and store the electricity rate information Eri in the memory 20.

In next step S3, the discharge plan creation section 15 accesses the weather information server 220 to acquire weather information Wei related to the area in which the secondary storage plant 130 is positioned. In next step S4, the power-in-use estimation section 14 estimates the commercial power to be used in the secondary storage plant 130 in the future in accordance with the first estimation condition to the fifth estimation condition described above. The discharge plan creation section 15 then creates a discharge plan in which the battery modules 51 accommodated in the battery module accommodation section 41 are discharged in a target time zone in which the commercial power to be used in the secondary storage plant 130 is estimated to exceed the contract power.

Through loop processing in subsequent steps S5 and S10, the charging and discharging control section 16 determines in step S5 whether or not the first discharging condition or the second discharging condition described above is satisfied and determines in step S10 whether or not the charging condition described above is satisfied. The charging and discharging control section 16 then brings the processing to step S6 when the first discharging condition described above or the second discharging condition described above is satisfied.

In step S6, the battery shipment prohibition section 17 prohibits the shipment of the battery modules 51 to be discharged under the first discharging condition or the second discharging condition described above. In this case, the charging and discharging control section 16 basically discharges the battery modules 51 in units of blocks 52 and the battery shipment prohibition section 17 may thus prohibit the shipment in units of blocks 52 to which the battery modules 51 to be discharged belong. In next step S7, the charging and discharging control section 16 discharges the battery modules 51 to be discharged under the first discharging condition or the second discharging condition described above.

In addition, when the charging condition described above is satisfied, the charging and discharging control section 16 brings the processing from step S10 to step S11 and charges the battery modules 51 to be charged under the charging condition described above.

4. Other Embodiments

In the embodiment described above, the charging and discharging control section 16 discharges the battery modules 51 and supplies the discharge power of the battery modules 51 as power to be used in the secondary storage plant 130 when the first discharging condition or the second discharging condition described above is satisfied. As another embodiment, the second discharging condition is not determined, but the first discharging condition alone may be determined to discharge the battery modules 51.

In the embodiment described above, the charging and discharging control section 16 charges the battery modules 51 with the commercial power in a time zone that offers a relatively low electricity rate on the basis of the electricity rate set for each of the time zones as illustrated in FIG. 4. As another embodiment, a configuration may be adopted in which processing of charging the battery modules 51 is not performed in this time zone that offers a relatively low electricity rate.

In the embodiment described above, the battery shipment prohibition section 17 is included and the shipment of the battery modules 51 to be discharged under the first discharging condition or the second discharging condition described above is prohibited, but a configuration may be adopted in which the battery shipment prohibition section 17 is omitted.

Figure 2:
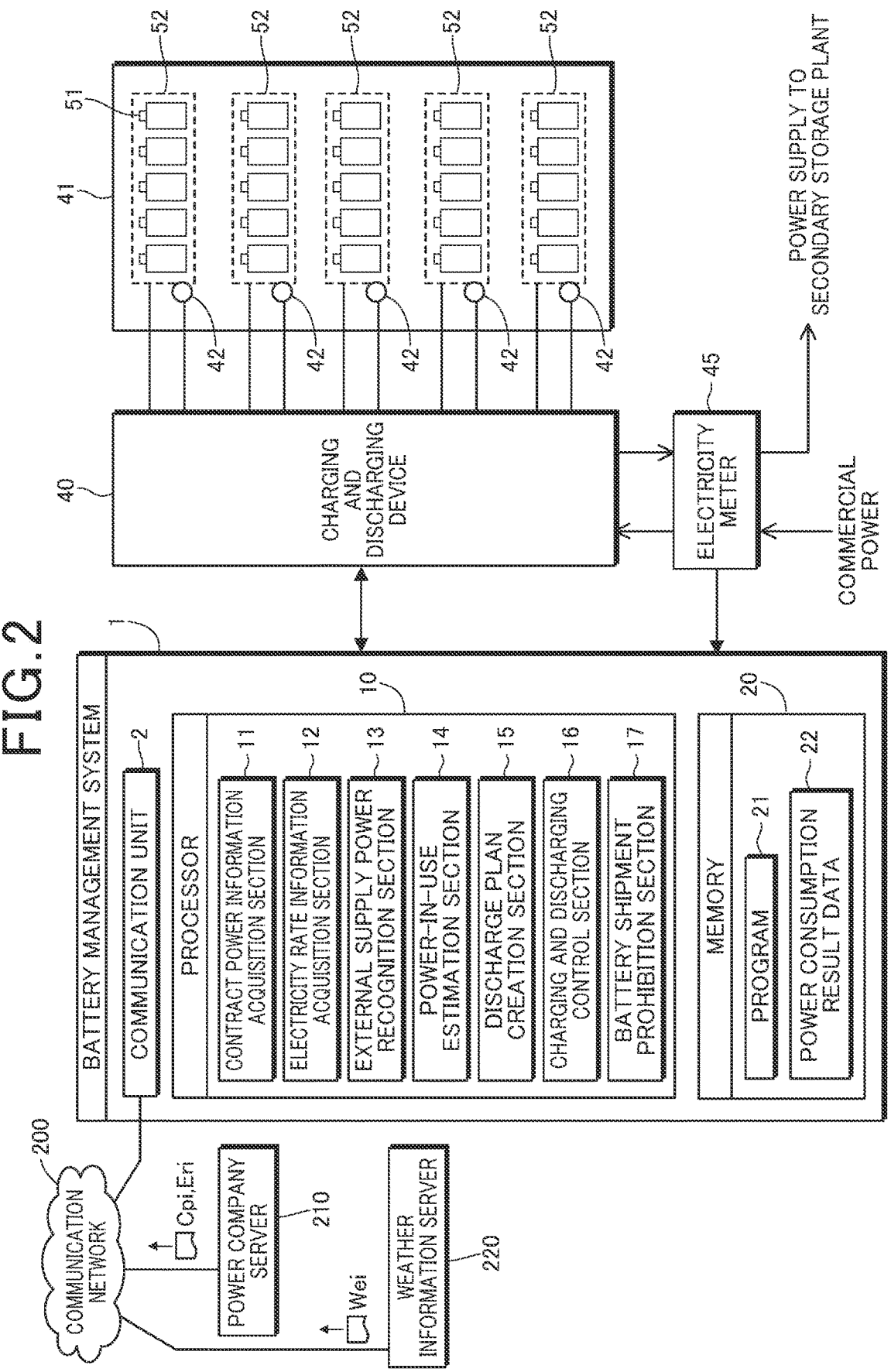
FIG. 2 is a configuration diagram of the battery management system.

It is to be noted that FIG. 2 is a schematic diagram in which the configuration of the battery management system 1 is divided in accordance with the chief processing contents for facilitating the understandings of the invention according to the present application. The battery management system 1 may be configured in accordance with other division. In addition, the processing of each of the components may be executed by one hardware unit or executed by a plurality of hardware units. In addition, the processing by each of the components illustrated in FIG. 5 may be executed by one program or executed by a plurality of programs.

5. Configurations Supported by Embodiments Above

The embodiments described above are specific examples of the following configurations.

(Configuration 1) A battery management system that manages charging and discharging of a used battery stored in a storage plant to which external supply power is supplied, in which a higher usage fee is set for the external supply power as predetermined contract power increases and the contract power is increased when the external supply power that is supplied to the storage plant exceeds the contract power, and the battery management system includes: a contract power information acquisition section configured to acquire contract power information indicating the contract power; a power-in-use estimation section configured to estimate the external supply power to be used in the storage plant in a target time zone in future; a discharge plan creation section configured to create a discharge plan in which discharge power from the battery is supplied as power to be used in the storage plant when the external supply power to be used in the target time zone exceeds the contract power, the external supply power to be used in the target time zone being estimated by the power-in-use estimation section; and a discharging control section configured to discharge the battery on the basis of the discharge plan.

The battery management system according to Configuration 1 makes it possible to increase a cost reduction effect on the external supply power brought about by the use of the discharge power from a collected used battery.

(Configuration 2) The battery management system according to Configuration 1, including an external supply power recognition section configured to recognize the external supply power that is being used in the storage plant, in which the discharging control section discharges the battery to supply the discharge power from the battery as the power to be used in the storage plant when the external supply power recognized by the external supply power recognition section exceeds determination power, the determination power being set to be less than the contract power.

The battery management system according to Configuration 2 discharges the battery in accordance with an actual use condition of the external supply power, thereby making it possible to keep the external supply power at or below the contract power and reduce the cost of the external supply power.

(Configuration 3) The battery management system according to Configuration 1 or 2, in which a usage fee for the external supply power is set for each of a plurality of divided time zones, the plurality of divided time zones dividing a predetermined target period, and the battery management system includes: an electricity rate information acquisition section configured to acquire electricity rate information indicating the usage fee for the external supply power set for each of the divided time zones; and a charging control section configured to charge, on a basis of the electricity rate information, the battery with the external supply power in the divided time zone for which a lower usage fee is set for the external supply power than a usage fee set for another divided time zone of a plurality of the divided time zones.

The battery management system according to Configuration 3 charges the battery with the external supply power in the divided time zone for which a relatively low usage fee is set, thereby making it possible to reduce the cost necessary to charge the battery.

(Configuration 4) The battery management system according to any one of Configurations 1 to 3, including a battery shipment prohibition section configured to prohibit shipment of the battery from the storage plant while the discharging control section is discharging the battery to supply the discharge power from the battery as the power to be used in the storage plant.

The battery management system according to Configuration 4 makes it possible to prevent the shipment of the battery from causing the loss of an effect of reducing the usage fee for the external supply power by discharging the battery.

(Configuration 5) The battery management system according to Configuration 4, in which the battery shipment prohibition section prohibits the shipment of the battery from the storage plant in units of blocks, the battery including a predetermined number of battery modules as one of the blocks in the storage plant, the battery being managed in the storage plant.

The battery management system according to Configuration 5 makes it possible to take countermeasures to easily prohibit the shipment of the battery in units of blocks. The battery is managed in units of blocks. The battery is being discharged to reduce the usage fee for the external supply power.

(Configuration 6) A battery management method that is executed by a computer to manage charging and discharging of a used battery stored in a storage plant to which external supply power is supplied, in which a higher usage fee is set for the external supply power as predetermined contract power increases and the contract power is increased when the external supply power that is supplied to the storage plant exceeds the contract power, and the battery management method includes: a contract power information acquisition step of acquiring contract power information indicating the contract power; a power-in-use estimation step of estimating power in use in the storage plant in a target time zone in future; a discharge plan creation step of creating a discharge plan in which discharge power from the battery is supplied as power to be used in the storage plant when the power in use in the target time zone exceeds the contract power, the power in use in the target time zone being estimated in the power-in-use estimation step; and a discharging control step of discharging the battery on a basis of the discharge plan.

The execution of the battery management method according to Configuration 5 by a computer makes it possible to obtain the workings and effects similar to those of the battery management system according to Configuration 1.

REFERENCE SIGNS LIST 1 battery management system
2 communication unit
10 processor
11 contract power information acquisition section
12 electricity rate information acquisition section
13 external supply power recognition section
14 power-in-use estimation section
15 discharge plan creation section
16 charging and discharging control section
17 battery shipment prohibition section
20 memory
21 program
22 power consumption result data
40 charging and discharging device
41 battery module accommodation section
42 battery sensor
45 electricity meter
50 battery pack
51 battery module
52 block
60 package
100 electric vehicle
110 primary storage plant
120 transport vehicle
130 secondary storage plant
131 commercial power supply equipment
140 transport vehicle

What is claimed is:

1. A battery management system that manages charging and discharging of a used battery stored in a storage plant to which external supply power is supplied, wherein
a higher usage fee is set for the external supply power as predetermined contract power increases and the contract power is increased when the external supply power that is supplied to the storage plant exceeds the contract power, and
the battery management system comprises a processor configured to function as:
a contract power information acquisition section configured to acquire contract power information indicating the contract power;
a power-in-use estimation section configured to estimate the external supply power to be used in the storage plant in a target time zone in future;
a discharge plan creation section configured to create a discharge plan in which discharge power from the battery is supplied as power to be used in the storage plant when the external supply power to be used in the target time zone exceeds the contract power, the external supply power to be used in the target time zone being estimated by the power-in-use estimation section;
a discharging control section configured to discharge the battery on a basis of the discharge plan; and
a battery shipment prohibition section configured to prohibit shipment of the battery from the storage plant while the discharging control section is discharging the battery to supply the discharge power from the battery as the power to be used in the storage plant.

2. The battery management system according to claim 1, wherein the battery shipment prohibition section prohibits the shipment of the battery from the storage plant in units of blocks, the battery including a predetermined number of battery modules as one of the blocks in the storage plant, the battery being managed in the storage plant.

3. A battery management method that is executed by a computer to manage charging and discharging of a used battery stored in a storage plant to which external supply power is supplied, wherein
a higher usage fee is set for the external supply power as predetermined contract power increases and the contract power is increased when the external supply power that is supplied to the storage plant exceeds the contract power, and the battery management method comprises:
- a contract power information acquisition step of acquiring contract power information indicating the contract power;
- a power-in-use estimation step of estimating power in use in the storage plant in a target time zone in future;
- a discharge plan creation step of creating a discharge plan in which discharge power from the battery is supplied as power to be used in the storage plant when the power in use in the target time zone exceeds the contract power, the power in use in the target time zone being estimated in the power-in-use estimation step;
- a discharging control step of discharging the battery on a basis of the discharge plan; and
- a battery shipment prohibition step of prohibiting shipment of the battery from the storage plant while the discharging control step is discharging the battery to supply the discharge power from the battery as the power to be used in the storage plant.

4. The battery management system according to claim 1, wherein the processor is further configured to function as an external supply power recognition section configured to recognize the external supply power that is being used in the storage plant, and the discharging control section discharges the battery to supply the discharge power from the battery as the power to be used in the storage plant when the external supply power recognized by the external supply power recognition section exceeds determination power, the determination power being set to be less than the contract power.

5. The battery management system according to claim 1, wherein a usage fee for the external supply power is set for each of a plurality of divided time zones, the plurality of divided time zones dividing a predetermined target period, and the processor is further configured to function as:

an electricity rate information acquisition section configured to acquire electricity rate information indicating the usage fee for the external supply power set for each of the divided time zones; and a charging control section configured to charge, on a basis of the electricity rate information, the battery with the external supply power in the divided time zone for which a lower usage fee is set for the external supply power than a usage fee set for another divided time zone of a plurality of the divided time zones.

* * * * *